Figure 1:
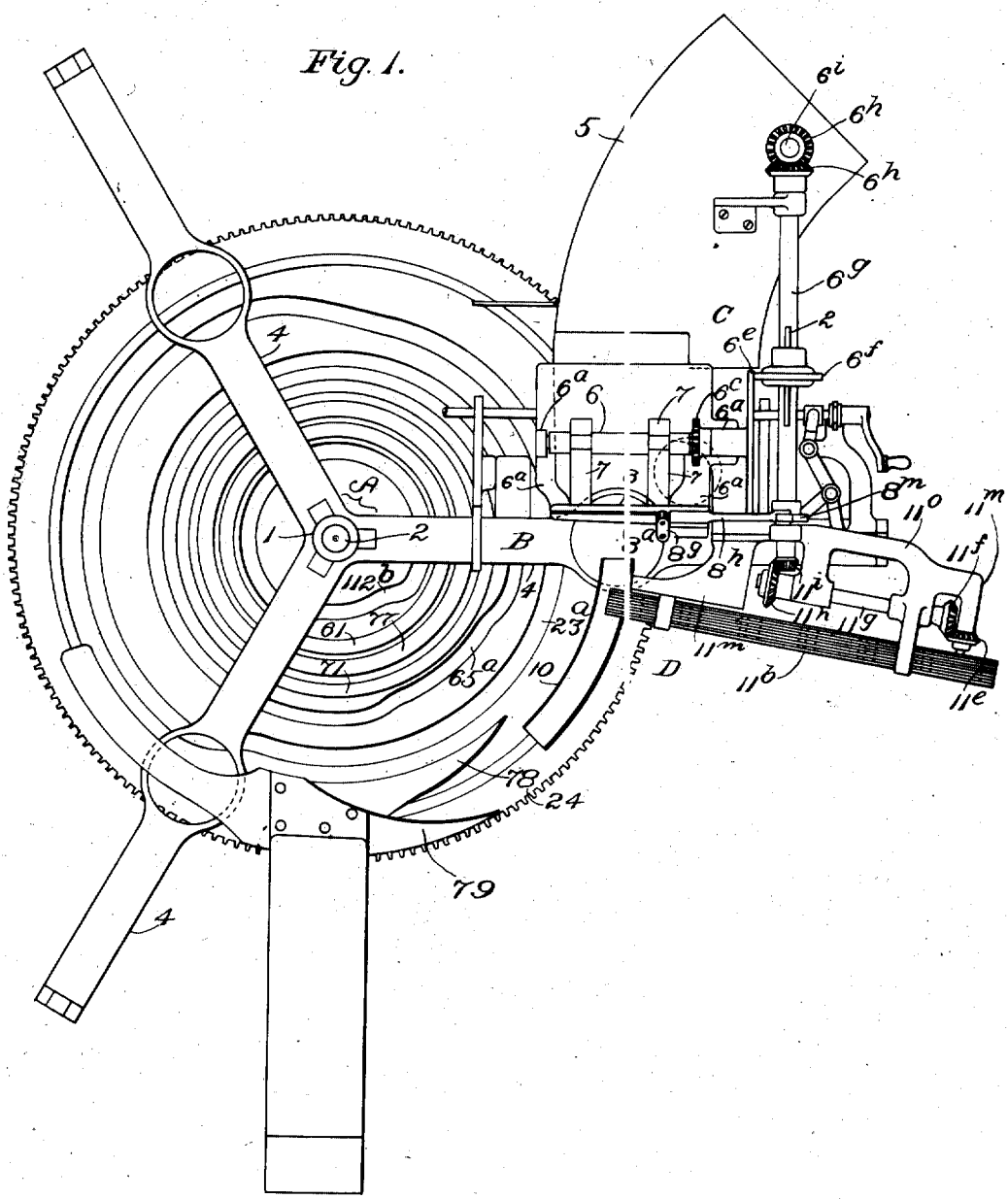

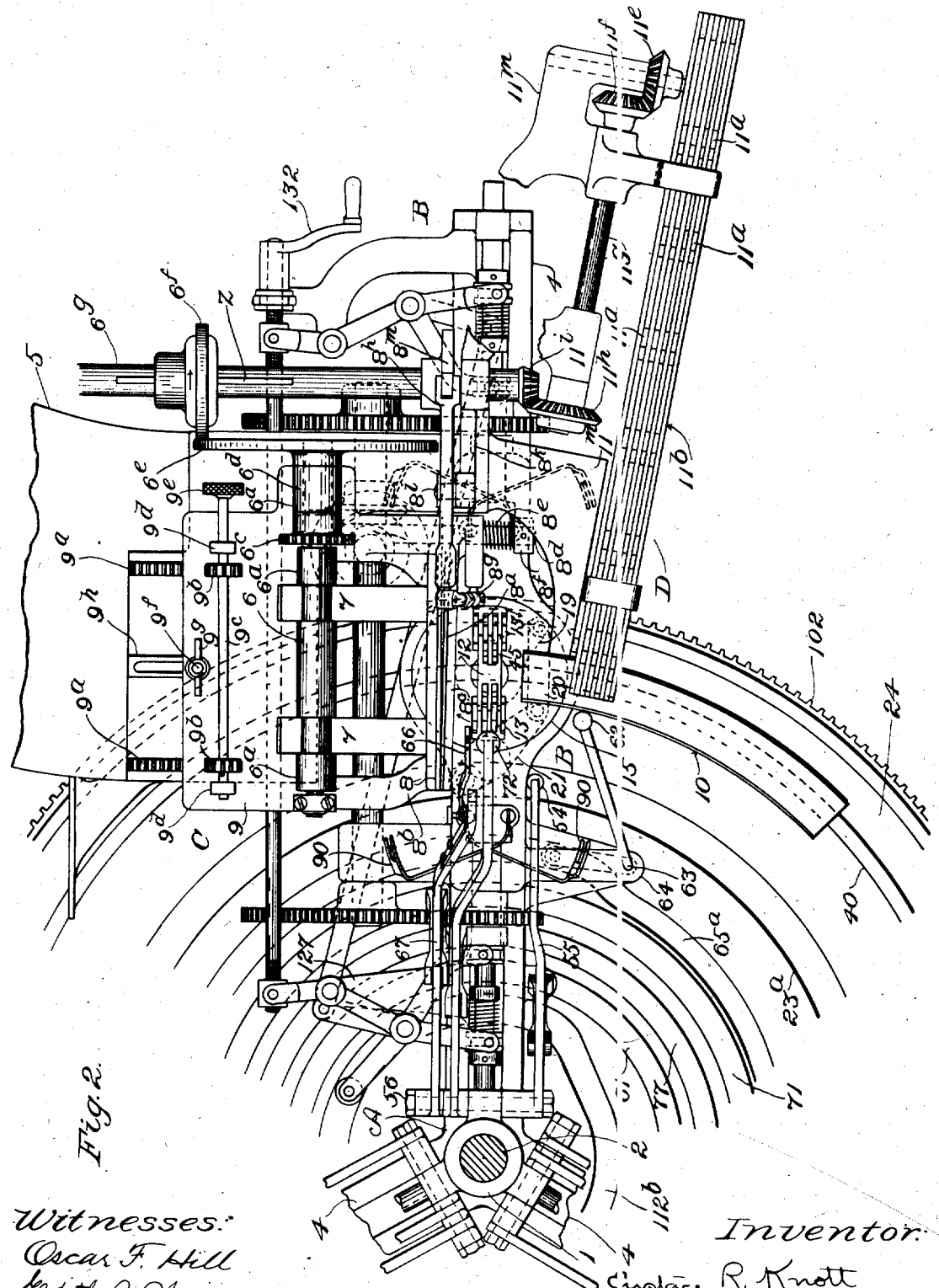

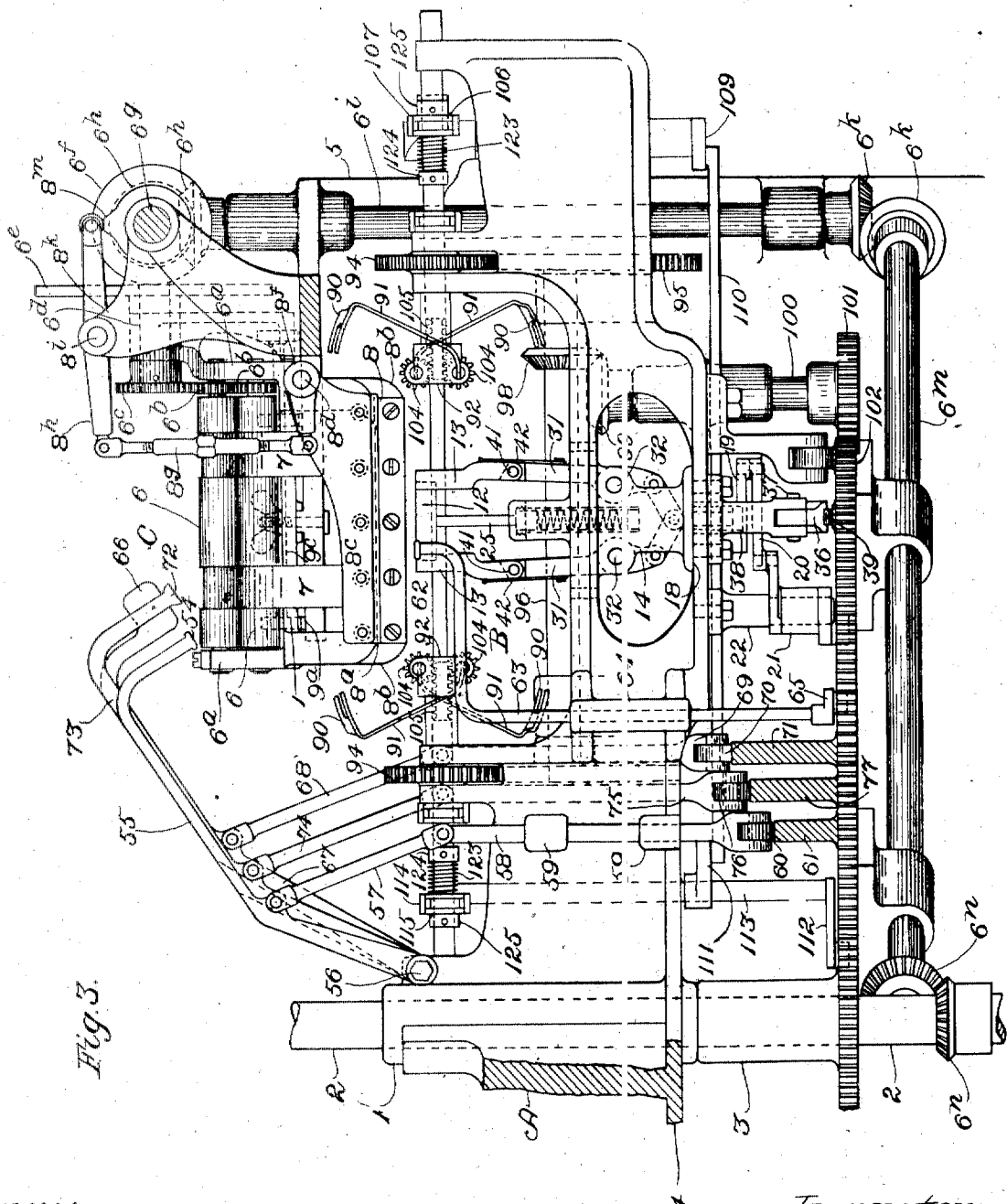

E. R. KNOTT.
WRAPPING MACHINE.
APPLICATION FILED OCT. 27, 1911.
1,216,702.
Patented Feb. 20, 1917.
6 SHEETS—SHEET 4.
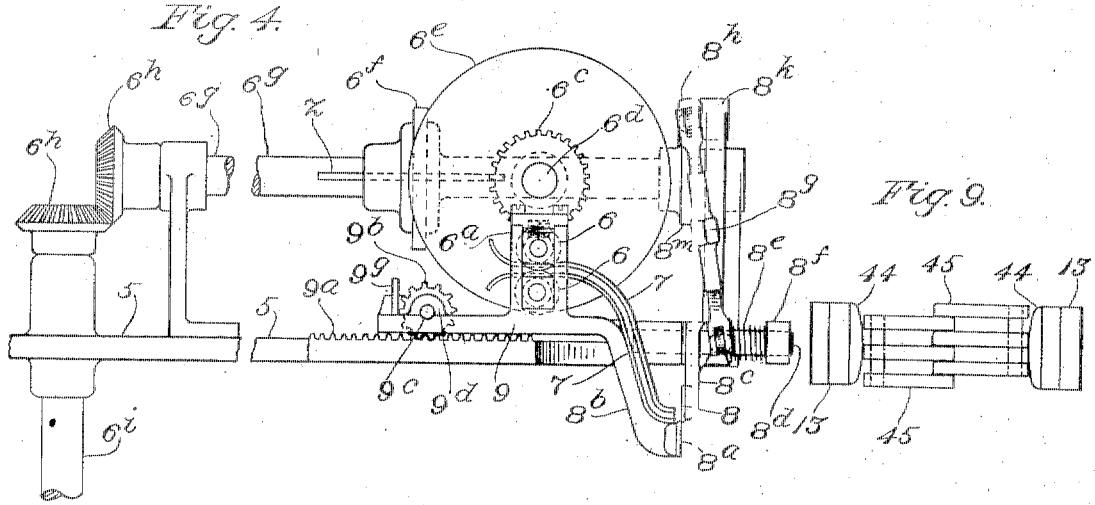
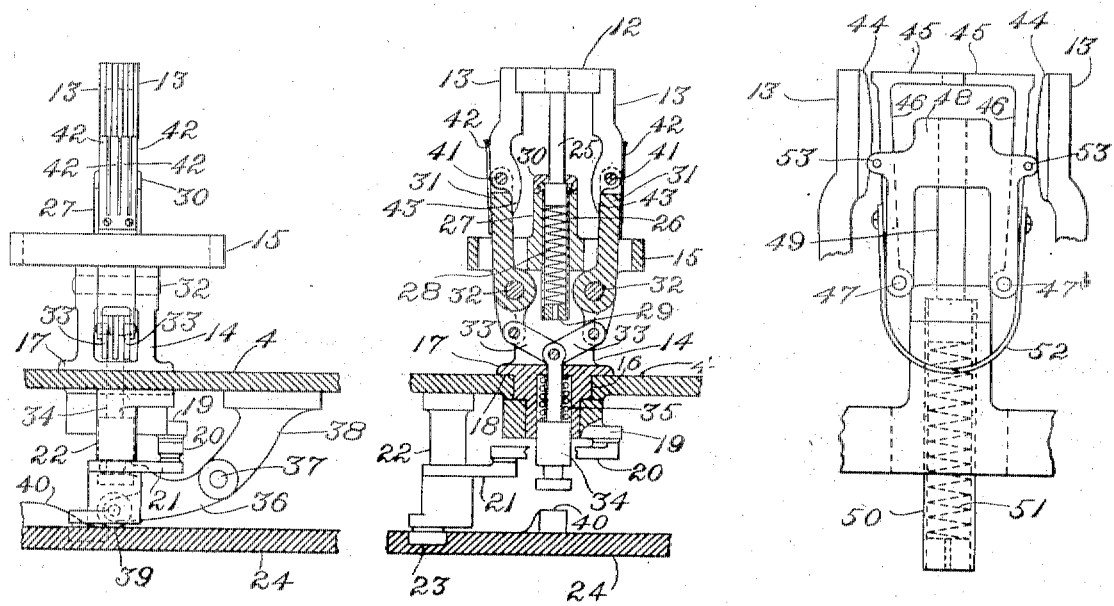
Witnesses:
Oscar F. Hill
Edith A. Wiseman
Inventor:
Eustace R. Knott
by Chas. F. Randall
Attorney.

E. R. KNOTT.
WRAPPING MACHINE.
APPLICATION FILED OCT. 27, 1911.
1,216,702.
Patented Feb. 20, 1917.
6 SHEETS—SHEET 5.
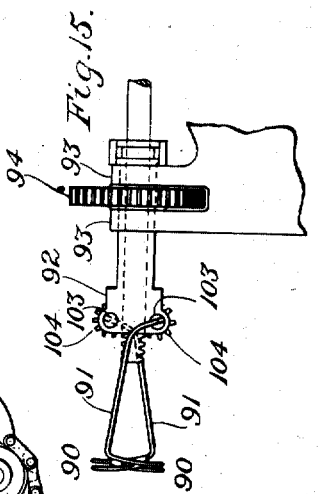
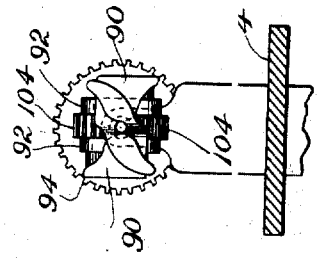
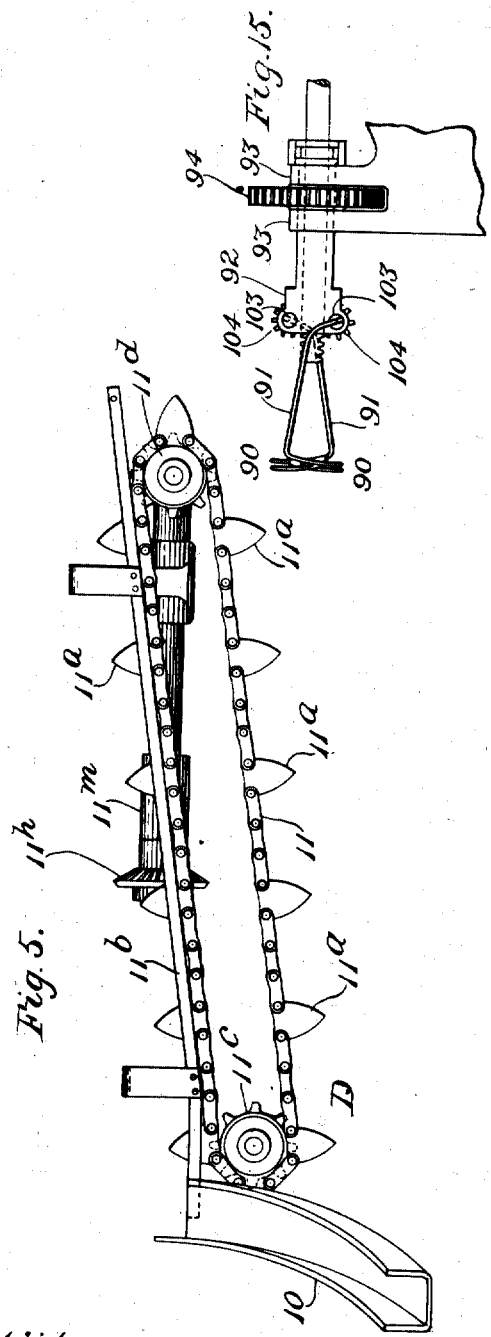
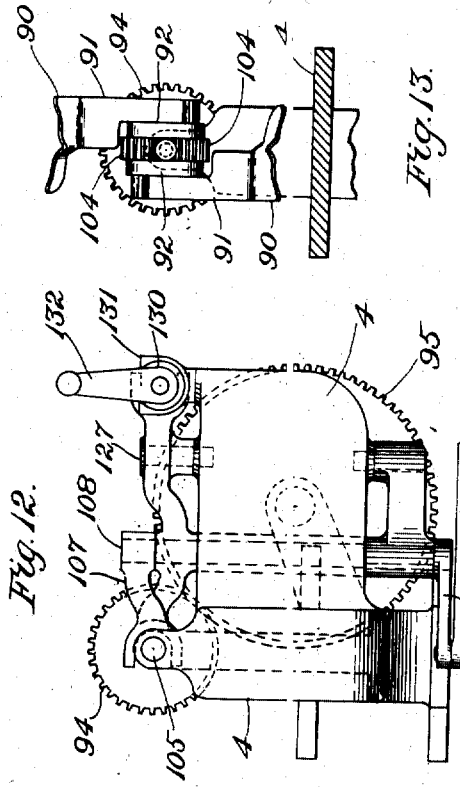
Witnesses:
Oscar F. Hill
Edith A. Wiseman
Inventor:
Eustace R. Knott
by Chas. F. Randall
Attorney.

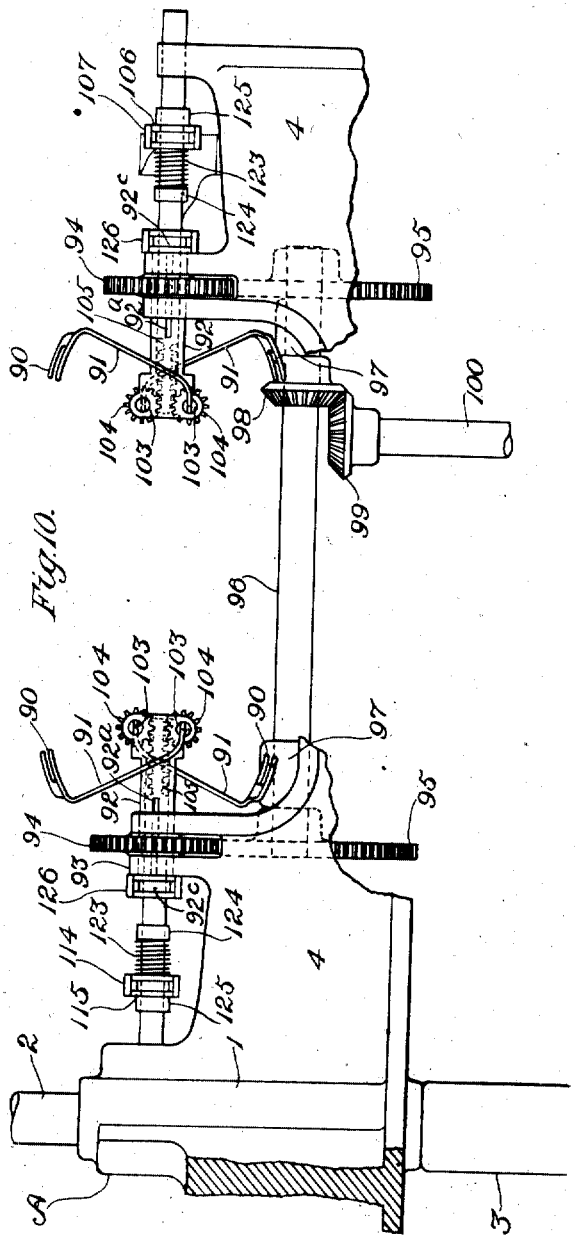

UNITED STATES PATENT OFFICE.

EUSTACE R. KNOTT, OF SHARON, MASSACHUSETTS.

WRAPPING-MACHINE.

1,216,702.  Specification of Letters Patent.  Patented Feb. 20, 1917.

Application filed October 27, 1911. Serial No. 657,160.

*To all whom it may concern:*

Be it known that I, EUSTACE R. KNOTT, a citizen of the United States, residing at Sharon, in the county of Norfolk, State of Massachusetts, have invented a certain new and useful Improvement in Wrapping-Machines, of which the following is a specification, reference being had therein to the accompanying drawings.

The invention has relation to machines for wrapping pieces of candy, fruits, and other small articles.

One general object of the invention is to produce a machine capable of a large output without excessive speed of the working parts thereof. Another is to produce a machine of great flexibility in its adaptation to the wrapping of articles of different sizes, and the construction of which shall be simple, effective, and practical, and not liable to get out of order or to become disarranged by unskilful handling. Special objects of the invention are to provide wrapping mechanism of improved character; to attain certain desirable results in the wrapping; and to provide a construction in which the feeding of a wrapper, the feeding of an article or articles for presently being inclosed within such wrapper, and the inwrapment of a previous article or articles within the wrapper therefor, may all proceed concurrently. Others are to provide a construction permitting the principal movements of certain of the main working parts to be regular and uninterrupted; also, permitting reciprocating movements in the working of such parts to be eliminated.

One form of embodiment of the invention is illustrated in the drawings, in which—

Figure 1 is a plan view, partly diagrammatic, of a machine containing an embodiment of the different features of the invention.

Fig. 2, Sheet 2, is a plan view on a larger scale of a part of the said machine, including one wrapping-head, one wrapper-supply station, and one article-supply station.

Fig. 3, Sheet 3, shows the parts of Fig. 2 mainly in elevation.

Fig. 4, Sheet 4, is a side elevation of a wrapper-supply station.

Fig. 5, Sheet 5, is an elevation of an article-supply station.

Fig. 6, Sheet 4, is a sectional view showing portions of the stationary cam-plate, a wrapping-head, and the receiver of said wrapping-head.

Fig. 7, Sheet 4, is a view in side elevation of the parts of Fig. 6.

Fig. 8, Sheet 4, is an elevation, on a somewhat larger scale showing a modified construction of receiver.

Fig. 9, Sheet 4, is a plan view of the receiver of Fig. 8.

Fig. 10, Sheet 6, is an elevation showing principally the twister-mechanism of a wrapping-head.

Fig. 11, Sheet 6, is a plan view of the parts of Fig. 10.

Fig. 12, Sheet 5, is an elevation thereof looking from the right in Figs. 10 and 11.

Figs. 13, 14, 15, Sheet 5, are views of one of the twisters.

The machine shown in the drawings is characterized by having a stationary wrapper-supply station, a stationary article-supply station, wrapping mechanism, and a traveling carrier by which the said wrapping mechanism, or the main elements thereof, is carried past the said stations, the whole being constructed and combined to present a wrapper to the wrapping mechanism as the latter travels past, supply an article or articles to be inwrapped, effect the inwrapment, and discharge the inwrapped article or articles. The said machine has been contrived with especial reference to enabling a plurality of wrapping mechanisms to be combined with the traveling carrier, so that, as the latter travels, the respective wrapping mechanisms successively will be carried past the wrapper-supply and article-supply stations, each wrapping mechanism in turn receiving a wrapper and an article or articles to be inwrapped, and then performing the wrapping operations. It has been contrived, also, with reference to enabling the employment of either one or a plurality of sets of feeding stations, so that while the traveling carrier is making one circuit a given wrapping mechanism may perform either one or a succession of complete wrapping operations.

Having reference to the drawings,—

A rotatable carrier is represented at A, and a wrapping-head supported and carried thereby is represented at B, a stationary wrapper-supply station being represented at C, and a stationary article-supply station at D. The function of the wrapper-supply mechanism located at the wrapper-supply station is, in general, to deliver a wrapper to the wrapping-head as the latter passes. The function of the article-supply mechanism at the article-supply station is, in general, to supply the article or articles to be inwrapped to the wrapping-head as the latter passes. The functions of the wrapping mechanism are, in general, to receive a wrapper from the wrapper-supply mechanism, and receive from the article-supply mechanism the article or articles to be inwrapped, inclose the said article or articles in the said wrapper, and complete the inwrapment thereof.

In its broader phases, the invention is not restricted with respect to the precise character, construction, and mode of operation of the wrapper-supply mechanism, or of the article-supply mechanism, or of the wrapping mechanism. Many forms of all these mechanisms, regarded separately, are known in the art, including mechanisms which feed a continuous strip of material and then separate it into short lengths suitable for wrappers, and also including mechanisms which feed from a stack of previously-prepared wrappers, and the spirit of my invention in its broader phases will be involved, whatever forms of these various mechanisms are utilized in carrying the same into effect.

Referring now to the construction as illustrated in the drawings,

The carrier A is mounted by means of its hub 1 (Figs. 1, 2, 3) upon an upright shaft 2, and is rotated in convenient manner, as for instance by engaging it with the said shaft and rotating the latter by suitable driving connections (not shown). A bearing for shaft 2 is shown at 3, in Figs. 3 and 10. Each wrapping-head comprises wrapping mechanism mounted upon an arm 4 of the carrier. One wrapping-head is shown, and in Fig. 1 are represented also the arms 4, 4, of two other wrapping-heads, the machine shown being intended to have three wrapping-heads. If desired, it may also have a plurality of wrapper-supply and article-supply stations, etc. The mechanism carried by each arm 4 includes devices for receiving a wrapper from the wrapper-supply station, means for taking the article or articles from the article-supply station and applying the same to the wrapper, means for bending the wrapper about the article or articles (hereinafter termed article) so as to infold the article in the wrapper, and devices for closing up the portions of the wrapper which project beyond the ends of the article and forming twists therein adjacent the said ends.

At each wrapper-supply station, the wrapper-supply mechanism is supported by a fixed arm 5, (Figs. 1, 2, 3, 4) forming a part of the machine-framing, on which arm the said mechanism is mounted above the path in which the wrapping-head travels. The wrapper-supply mechanism comprises a pair of feed-rolls 6, 6, means for rotating the said feed-rolls, upper and lower strip-guides 7, 7, shears 8, 8$^a$, and means for actuating the movable member of the said shears.

The feed-rolls are mounted in suitable stands 6$^a$, 6$^a$. The continuous strip of wrapper-material passes between the feed-rolls, and is advanced or fed through the strip-guides and between the shear-blades by the rotation of the feed-rolls, being thereby drawn from a conveniently located supply-roll (not shown). The feed-rolls are geared together by spur-pinions 6$^b$, 6$^b$, (Fig. 3) and are driven by means of a spur-gear 6$^c$ meshing with the spur-pinion of the upper feed-roll, the said spur-gear being fixed upon the inner end of a short shaft 6$^d$, mounted in a bearing at the top of one of the stands 6$^a$, the said shaft 6$^d$ having fixed upon its outer end a driven brush-wheel 6$^e$, with the outer side-face of which engages the periphery of a driver brush-wheel 6$^f$ mounted upon a rotating shaft 6$^g$ and fixed to the latter by a key $z$. The shaft 6$^g$ is driven by means of bevel gear-wheels 6$^h$, 6$^h$, from an upright shaft 6$^i$, (Figs. 1 and 3) the latter being driven by means of bevel gear-wheels 6$^k$, 6$^k$, (Fig. 3) from a horizontal shaft 6$^m$, and this last being driven by means of bevel gear-wheels 6$^n$, 6$^n$, from the central upright shaft 2. The invention is not restricted to this particular feed-roll mechanism.

The guides 7, 7, are supported in convenient manner in working position with relation to the feed-rolls and shear-blades. They extend from the receiving side of the feed-rolls, between the latter, which are grooved circumferentially to receive the rear portions of the guides, and from the feed-rolls the said guides extend forward to the shears. The rear ends of the upper and lower guides of each pair thereof are spread apart behind the feed-rolls, to facilitate the entrance of the wrapper-strip between them. The wrapper-strip is confined vertically between the said guides, intermediate the feed-rolls and the shears. When the feed-rolls are caused to rotate continuously, as for convenience they are in the illustrated construction of machine, the brief arrest of the advancing movement of the leading end of the strip by the closed shears, every time the latter are operated to cut off a wrapper, results in more or less tendency of the strip to buckle up or down. By restraining that portion of the strip which extends from the feed-rolls to the shears by means of the upper and lower guides, this tendency to buckling is prevented from operating to cause such portion of the strip to fold upon itself or follow the rolls around. The advance of the leading portion of the strip to and beyond the shears when the latter are open is facilitated by locating the shears at a lower level than the feed-rolls, and inclining the guides downwardly from the bite of the rolls to positions just above the acting edge of the lower, or fixed, shear-blade 8ª, so that the said leading portion slides down to and past the said shear-blade.

The shear-blade 8ª is fixed to a support 8ᵇ, (Fig. 4, Sheet 4) the movable upper shear-blade 8 being attached to an arm 8ᶜ (Figs. 3 and 4) mounted pivotally upon a stud 8ᵈ in connection with the said support. A coil-spring 8ᵉ (Figs. 2 and 4) surrounding the said stud, and having one end engaged with the hub-portion of arm 8ᶜ and the other with a collar 8ᶠ fixed upon the said stud, acts expansively with a tendency to press the blade 8 against the blade 8ª, to insure good cutting action, and in addition acts torsionally with a tendency to raise the arm 8ᶜ and upper-shear blade after they have been depressed for cutting, and to hold them raised. The said arm and blade are actuated for cutting by means of a link 8ᵍ having one end thereof pivotally connected with the arm 8ᶜ, a lever 8ʰ to which the other end of said link is pivotally connected, the said lever being pivotally mounted at 8ⁱ (Figs. 2 and 3) upon a supporting stand 8ᵏ, and a cam 8ᵐ fixed upon shaft 6ˣ, with which cam a roll carried by the said lever is held in engagement by means of spring 8ⁿ. By means of the said cam, the movable shear-blade is actuated to cut the strip after the predetermined length of strip for a wrapper has passed between the open shear-blades. Various modifications in the construction, etc., of the cutting mechanism may be made in practice.

The cutting action is timed to take place as the wrapping-head arrives in position to receive a wrapper, and slightly precedes the closing of the wrapper-seizing means carried by the wrapping-head upon the said wrapper. The feed-roll actuating devices cause the feed-rolls to feed the desired length of strip for a wrapper between each two cutting movements of the movable shear-blade. The rate of feed is proportioned to the relative diameters of the two brush-wheels, and to the distance of the point of driving-contact between the two wheels from the center of the driven brush-wheel. This is primarily adjusted by setting the driver brush-wheel 6ᶠ at the proper point upon its shaft 6ᵍ and fixing it there by means of its key z. By varying the speed of the feed-rolls, more or less of the strip may be fed between successive cutting movements, and thereby the length of wrapper may be increased or diminished. This variation in speed is brought about by relative adjustment of the brush-wheels so that the driving contact between the two brush-wheels shall take place closer to or farther from the center of the driven brush-wheel 6ᵉ. When the adjustment causes the driving contact to take place nearer the center of the said driven brush-wheel, the rate of delivery and length of wrapper are increased, and when the adjustment causes such contact to take place farther from the said center the rate of delivery and length of wrapper are reduced.

It is desirable that the center of every wrapper should occupy the same position upon the wrapping-head, or approximately the same position, when the wrapper is held by the wrapping-head. Changes in the length of wrapper, produced by relative shifts of the brush-wheel causing the driving-contact between them to take place at different distances from the center of the driven-wheel, would cause the centers of wrappers of different lengths to occupy different positions when such wrappers are taken by the wrapping-head, unless compensation for the differences in length were made. I provide for such compensation by mounting the feed-rolls and shears so that they may together be adjusted forward and back in the line of feed, in order that when an increase in length of wrapper is brought about by increase in the speed of the feed-rolls the said parts may be set back proportionately, thereby locating the middle of the length of the longer wrapper in the same or substantially the same position with relation to the receiver therefor on the wrapping-head, and in order also that when a decrease in length is brought about by decrease in the speed of the feed-rolls the parts aforesaid may be set forward proportionately, and thereby locate the middle of the length of the shorter wrapper in the same or approximately the same position as that of the wrapper of greater length. Preferably, I construct, arrange, and combine the parts so that both the adjustment of the rate of feed and the adjustment of the feed-rolls and shears bodily are effectuated conjointly and simultaneously by simple manipulation by one adjusting device. The mode of constructing, etc., the parts may vary in practice.

In the drawings, (see more particularly Fig. 9) the stands 6ª, 6ª, for the feed-rolls, and the support 8ᵇ for the shears, are mounted upon a carriage 9. The said carriage, therefore, supports the feed-rolls, the driven brush-wheel, and the shears. It is mounted upon the fixed arm 5 of the machine framework and is movable thereon back and forth in the line of the feed of the wrapper strip. Adjustment of this carriage in the direction to shift the center of the driven brush-wheel 6ᵉ nearer to the driver brush-wheel 6ᶠ, whereby an increase in rate of delivery and in length of wrapper are secured, also shifts the wrapper-feeding and cutting devices bodily backward to the extent necessary for locating the center of the longer wrapper at or approximately at the proper point for the center. Adjustment of the carriage in the opposite direction, to shift the center of the driven brush-wheel 6ᵉ farther from the driver brush-wheel 6ᶠ, giving a decreased rate of delivery and a shorter length of wrapper, also shifts the wrapper-feeding and cutting devices bodily forward to the extent necessary for locating the center of the shorter wrapper at or approximately at the predetermined point. A convenient form of devices for effecting the shift or adjustment of carriage 9 upon arm 5 comprises the racks 9ᵃ, 9ᵃ, (Figs. 2 and 4) in fixed connection with the arm 5, pinions 9ᵇ, 9ᵇ, engaging such racks, a shaft 9ᶜ on which said pinions are fixed, the said shaft extending transversely with reference to the carriage and being mounted in bearings 9ᵈ, 9ᵈ, thereon, and a thumb-wheel 9ᵉ, (Fig. 2) upon the shaft 9ᶜ, by means of which the shaft and pinions may be turned manually. When the shaft is turned, the pinions travel along the racks, and the shift of the carriage is thereby caused. The carriage is fixed in the position in which it has been set by the adjusting devices, by means of a clamping bolt 9ᶠ (Fig. 2) and wing-nut 9ᵍ. The stem of the said bolt works in a slot in a strip 9ʰ attached to arm 5, and also extends through a hole in the carriage. The head of the bolt is located beneath the strip 9ʰ, and wing-nut 9ᵍ is located above the flat bed of the carriage. When the wing-nut is turned down tightly against the said bed, the latter is clamped to the said strip 9ʰ and inasmuch as strip 9ʰ is fixedly attached to arm 5, thereby the carriage is secured in adjusted position. The slot in strip 9ʰ permits the stem of the bolt to move with the carriage.

At the article-supply station D a support 10 (Figs. 1, 2 and 5) is provided for the article or articles to be inwrapped, and from which the said article or articles (hereafter termed article) is taken by the means with which the wrapping-head is provided for that purpose, as the wrapping-head passes the said station. The said support is, in this instance, a trough located above the path in which the wrapping-head travels, and inclined downwardly toward its forward end. It is mounted upon a fixed support. An article deposited within said trough is swept or pushed along the same by a device which presently will be described, and passes downward from its lower front end upon the wrapper held by the wrapping-head and being carried around with the latter. Preferably, automatic means of feeding successive articles to the support 10 is combined with the latter. A convenient form of such means is shown, it comprising an endless flexible feed-chain 11 (Fig. 5) having projections 11ᵃ, 11ᵃ, and a stationary rack or grate 11ᵇ, (Figs. 1, 2, 5) the slots or openings of which extend lengthwise thereof. The projections 11ᵃ, 11ᵃ, of the upper run of the said feed-chain work within the said slots or openings, and project above the rack or grate, so as to engage articles resting upon the latter and push them along the rack or grate, and deliver them successively to the support 10. The feed-chain extends around carrying wheels 11ᶜ, 11ᵈ, which are mounted upon a fixed support 11ᵐ (Figs. 1, 2, 5). The carrying wheel 11ᵈ has combined therewith driving mechanism comprising a bevel-gear 11ᵉ (Figs. 1 and 2) fixedly connected with the said carrying wheel 11ᵈ, a driving bevel-gear 11ᶠ meshing with bevel-gear 11ᵉ, a shaft 11ᵍ on which the bevel-gear 11ᶠ is fixed, a second bevel-gear 11ʰ also fixed on said shaft, and a bevel-gear 11ⁱ fixed on shaft 6ᵍ and in mesh with bevel-gear 11ʰ. Shaft 11ᵍ is mounted in bearings in the fixed support 11ᵐ. Any other approved driving arrangement for the article-feed chain or conveyer may be employed in practice.

The wrapping-head is furnished with a receiver for the wrapper and the article which is to be inwrapped therein, the said receiver receiving the wrapper as the latter is taken at the wrapper-supply station, and holding it in position while the article taken at the article-supply station is applied thereto. The receiver is provided with a rest 12, (Figs. 2, 3, 6) and side-jaws or pressers 13, 13, at opposite sides of the said rest. The said parts are mounted upon a support 14, (Figs. 6 and 7) which in turn is mounted upon the arm 4 of the carrier. In the working of the machine, the receiver is turned about a vertical axis of its own. At the time when the wrapper and article are fed to the receiver, the latter occupies its normal position shown in Figs. 2 and 3. It subsequently is given a quarter turn about the said vertical axis to present the end-portions of the wrapper to devices which act thereon, and later by another turning movement is restored to its normal position. This turning movement of the receiver is provided for by forming the support with cylindrical portions 15, 16, (Figs. 1, 6, 7), which are fitted to upright bearings in the arm. The receiver is supported vertically by means of a radially projecting flange 17, (Figs. 6 and 7), which rests upon the arm 4 at 18, (Fig. 6.) The means for turning the receiver may vary in practice. Herein it comprises an arm 19 that is sleeved upon the lower portion of the support 14, and fixed thereon, the said arm being joined by a link 20 to one arm of a rocker 21 rocking about a vertical axis and supported by a stud 22 extending downward from the arm 4, the other arm of the said rocker being furnished with an anti-friction roll 23 working in the groove 23ª (Figs. 1 and 2) of a stationary cam-plate 24. As arm 4 makes its circuit, the said anti-friction roll travels around within the said groove, the walls of which by their varying shape occasion swinging movements of the rocker, which are transmitted to the receiver and occasion the required turning movements of the latter.

The rest 12 (Figs. 2, 3, 6) of the receiver is yieldingly upborne, in order that when the wrapper and the article to be wrapped are received thereon, and pressure is applied to the article to cause it to pass down into place between the side-jaws or pressers 13, 13, the rest may yield to the pressure, and automatically accommodate itself to articles of different sizes. Also, in order that when the wrapping operations have been completed, and the side-jaws or pressers have been opened to relieve the now inwrapped article from restraint, the rest may rise to its normal position, lifting the wrapped article out from between the side-jaws or pressers, to a position above the latter. In Figs. 6 and 7 the rest is mounted upon the upper end of a spindle 25, the lower end of which works within a tube 26 contained within a post 27 rising from the upper portion of the support 14. An expanding spiral spring 28 is confined in the said tube, between the lower end of the said spindle and a plug 29 occupying the lower end of the tube. The spring acts with a tendency to keep the rest 12 normally in its elevated position at the top of the side-jaws or pressers 13, 13. A cap 30 at the top of post 27 limits the extent of the rise of the rest, through engagement with the shoulder at the top of the enlarged lower end of the spindle 25.

The side-jaws or pressers 13, 13, (Figs. 2, 3, 6, 7) of the receiver comprise opposite clamping members carried by levers 31, 31, (Fig. 6) which are pivoted at 32, 32, to the support 14. For the actuation of the side-jaws or pressers the lower arms of the levers 31, 31, respectively have pivotally connected therewith the outer ends of links 33, 33, the inner ends of which are joined by a pivot to the upper end of an endwise-movable plunger 34. The said links, through their connection with the levers and with the plunger constitute a toggle. The main portion of the said plunger works in a central chamber in the lower portion of the support 14, its lower end being enlarged to fit the wall of the said chamber. An expanding spiral spring 35 is compressed between the shoulder at the top of such enlargement and an internal shoulder at the upper end of the chamber. This spring acts with a tendency to move the plunger downward, and draw downward the joint of the toggle, so as to pull the lower arms of the levers 31, 31, toward each other and thereby separate the engaging portions of the side-jaws or pressers 13, 13. Through the action of the spring, the side-jaws or pressers normally are kept in their most widely opened positions. For the purpose of moving the side-jaws or pressers toward each other, to clamp an article lying between them on the rest 12, the plunger is actuated to move the same upward against the resistance of the spring 35. The means of causing the upward movement of the plunger may vary in practice. Herein, a lever 36 (Figs. 3 and 7) is pivoted at 37 to a small bracket 38 extending down from arm 4. One arm of the said lever engages with the plunger, while the other carries an anti-friction roll 39 which travels upon the upper surface of the stationary cam-plate 24. A raised portion of the cam-path 40 for the roll 39 swings the said lever 36 upward at the proper time, and thereby moves the plunger upward so as to straighten the toggle and thus turn the levers 31, 31, upon their respective pivots 32, 32, and thereby swing the side-jaws or pressers 13, 13, inward toward each other, closing them upon the article between them. As soon as the roll passes the raised portion of the cam-path and descends upon the lower portion of the said path, the spring 35 depresses the plunger and bends the toggle so as to swing the levers 31, 31, reversely and thereby open the side-jaws or pressers apart, relieving their hold upon the article between them.

I make provision for avoiding too great a degree of pressure of the side-jaws or pressers 13, 13, upon the piece of candy or other article and wrapper between them. To this end I make provision for securing a yielding action of the side-jaws or pressers in closing toward each other. Such provision or provisions may be variously located in connection with the side-jaws or pressers and their supporting and operating parts and devices. In Figs. 3, 6, 7, the side-jaws or pressers 13, 13, are connected with the carrying levers 31, 31, therefor by pivots 41, 41, and receive the pressure of leaf-springs 42, 42, which are attached to the carrying levers 31, 31, the said leaf-springs operating with a tendency to cause the side-jaws or pressers to turn toward each other on their pivotal connections with the carrying levers and to hold tail-portions 43, 43, (Fig. 6) of the said side-jaws or pressers in engagement with the inner surfaces of the upper portions of the carrying levers. The relief arrangement thus constituted obviates damage to candy which is liable to be crushed by undue pressure, and also obviates tendency to produce undue adhesion of the wrapper to candy of a sticky nature.

To render the side-jaws or pressers effective in clasping the sides of the wrappers against pieces of candy or other articles of different sizes with equal facility and effectiveness, the rest 12 is slotted at its opposite ends, and the side-jaws or pressers 13, 13, are formed with a number of fingers or strips which work in the slots of the rest 12. This construction enables the fingers of the side-jaws or pressers to move inward within the slots until they encounter the opposite sides of a piece of candy or other article lying on the rest. To insure proper engagement of the fingers of the side-jaws or pressers with the opposite side-portions of the wrapper, and the desired action of the said jaws in holding the side-portions of the wrapper pressed closely against opposite sides of a piece of candy or other article lying upon the wrapper, the throw of the actuating devices for the side-jaws or pressers is made sufficiently great to cause such jaws to close together to the extent required for coöperation with a piece of candy or other article of the smallest size transversely which the machine is intended to handle, the relief-contrivance yielding to obviate harmful results when larger pieces are operated upon.

Figs. 8 and 9 (Sheet 4) show another construction of rest and side-jaws or pressers. In this construction the working or clasping portions of the side-jaws or pressers are faced with yielding cushions 44, 44. These last may be of any convenient and suitable character. A variety of cushioning arrangements is known in the different arts and many of the known forms and types of cushions are suitable for my purposes. I contemplate employing a strip or block of rubber, for instance sponge rubber, which latter may, if desired, have a smooth facing.

In Figs. 8 and 9 the closing together of the side-jaws or pressers to varying extents corresponding with different sizes of pieces of candy or other articles operated upon, is provided for by the employment of a self-expanding rest which collapses transversely under the inward pressure of the side-jaws or pressers as the latter close together. The said rest comprises opposite sets of fingers 45, 45, those of one set alternating with those of the other set and working in the intervening spaces. The acting portions of the said fingers are located between the working faces of the respective side-jaws or pressers. The fingers are provided upon the upper ends of arms 46, 46, which are pivoted at 47, 47, at their lower ends to the lower ends of the side-arms of an inverted U-shaped yoke 48 carried by the upper end of a stem 49, the said stem working in a vertical guide-post 50 containing an expanding spiral spring 51 that operates with a tendency to elevate the said stem, yoke, arms, and fingers. The rest is normally held expanded by means of a convenient spring. A suitable spring for the purpose is shown at 52, it being U-shaped and its opposite arms being respectively engaged with the arms 46, 46, and acting in connection with the latter to move them away from each other so as to expand the rest, the extent of the separating or expanding movement being limited by stop-pins 53, 53, carried by the side-arms of the yoke 48, with which stop-pins the arms 46, 46, engage in their outgoing movements.

The wrapping-head is furnished with means for taking hold of a wrapper furnished by the wrapper-supply head, taking the wrapper from the wrapper-supply head, and holding such wrapper in proper relation with respect to the rest and the side-jaws or pressers so that a piece of candy or other article received from the article-feeding head shall be received properly upon such wrapper. Such means comprises in the present instance a pair of fingers which close together at the proper time upon the wrapper, taking the latter as it is supplied by the wrapper-supply head and causing it to accompany the wrapping-head as the latter passes below the article-supply chute 10, holding the wrapper in place until the article supplied by the article-supply feed is received upon the wrapper and until the wrapper and the said article are depressed between the side-jaws or pressers 13, 13, and clasped by the said side-jaws or pressers, the said fingers then separating.

One of the said fingers is shown at 54, (Figs. 2 and 3) it being constituted by the down-turned extremity of an arm 55 of considerable length which is hung adjacent the center of the machine upon a pivot 56 carried by the arm 4. The said arm 55 and finger 54 are given the required movements at the proper times by means of actuating mechanism comprising a link 57, a slide-rod 58, and a fixed cam 61 on stationary plate 24. The said link has one end thereof connected pivotally to arm 55, the other end thereof being connected pivotally to the upper end of the slide-rod 58. The said slide-rod works in guides 59, 59, on the said arm 4. Its lower end carries an anti-friction roll 60 which travels on the upper edge of the fixed cam 61. This cam is so shaped that it holds the finger 54 normally raised to a height sufficient to clear the parts of the wrapper-supply, so that as the wrapping-head passes the wrapper-supply head the finger 54 passes clear above the wrapper-supply devices. The cam 61 is formed to lower the finger 54 immediately after passing the wrapper-supply devices. The coacting finger 62 is formed on the extremity of a horizontally-projecting arm at the upper end of a vertical rod 63, (Fig. 3) the latter being mounted in a bearing 64 on the arm 4 and carrying at its lower end an arm 65 furnished with a pin or roller traveling in a cam-groove 65ᵃ (Fig. 2) in the stationary plate 24. The said cam-groove is so shaped that normally the vertical rod 63 is turned so as to swing its finger 62 away from and clear of the side-jaws or pressers 13, 13, so that the said finger shall not interfere with the said side-jaws or pressers as the receiver is rotated on its vertical axis. The said cam-groove is also so shaped that at the proper time with reference to the movement of the wrapping-head past the wrapper-supply head the finger 62 shall be swung around horizontally into a position close to the receiver, to receive the pressure of the descending finger 54 and coact with the latter in grasping and holding the wrapper until after the wrapping-head has received the article to be inwrapped, the cam-groove being so shaped that the finger 62 then is swung around into retracted position.

Means is provided for causing at the proper time an article deposited by the article-feed in chute 10 to be delivered from the said chute to the wrapper carried by the wrapping-head and overlying the rest 12. For convenience I have in the present place mounted upon the wrapping-head a finger 66 (Figs. 2 and 3) at the end of an arm 67 mounted upon the pivot 56. This arm and finger are normally held raised in such position that the finger shall clear the wrapper-supply head in passing the latter by passing over the feed-rolls and cutter-devices of the wrapper-feed mechanism. On passing the said wrapper-feed mechanism the finger 66 is lowered into the trough 10 so as to engage with the article supplied by the article-feed and push the same along and down the chute 10, and on to the wrapper as the latter is carried by the traveling wrapper-head past the lower end of the chute. The operating connections of the arm 67 and finger 66 comprise a link 68 which is connected pivotally at its upper end to the said arm and at its lower end to a vertically-movable rod 69, the said rod working up and down within a suitable guide carried by the arm 4 and being provided at its lower end with a roller or follower 70 working on a raised cam 71 in fixed connection with the table 12. This cam 71 is so shaped as to raise the finger 66 after it has performed its work in connection with the chute 10 at one article-supply station, and hold it raised until after it has passed the next wrapper-supply mechanism, and then lower it in season to act to effect the delivery of an article from the chute 10 of the next article-supply station.

As soon as the article has been deposited upon the wrapper carried by the wrapping-head, it is acted upon by a presser-device by means of which it and the wrapper and the table 12 upon which the article and wrapper rest are caused to descend between the working faces of the side-jaws or pressers 13, 13. In the present embodiment of the invention the presser-device is a finger 72 (Figs. 2 and 3) which is carried by an arm 73, pivoted at 56 upon the arm 4 of the wrapping-head, and operated through connections and devices resembling those which are combined with the carrying arms of the fingers 54 and 66. That is to say, the arm 73 has pivotally connected therewith the upper end of a link 74 having its lower end pivotally connected with the upper end of a rod 75 adapted to slide up and down in a fixed guide in connection with the arm 4 and carrying at its lower end an anti-friction roller 76 traveling upon a fixed cam 77 in connection with the fixed plate 24. The raised portion of the said cam 77 acts to raise the arm 73 and the presser-finger 72, and holds them normally raised in the position in which they are shown in Fig. 3, so as to clear the wrapper-feed mechanism in passing the latter, the said cam being so shaped as to allow the presser-finger 72 to descend upon the article as soon as it has landed in place upon the wrapper, and by pressure thereon force the rest 12, wrapper, and article down between the side-jaws or pressers 13, 13. A suitable spring (not shown) is operatively combined with the presser-finger to assist in producing this action. Other springs (also not shown) are employed in practice to insure the descent of finger 54 and finger or sweep 66.

As the rest 12, wrapper, and article are pressed down between the side-jaws or pressers 13, 13 in the manner just explained, the upper ends of the said jaws support the side-portions of the wrapper, and consequently such side-portions are turned upward as a result of the article and the middle portion of the wrapper being pressed downward between the side-jaws or pressers. Normally, the jaw-devices occupy the position in which they are represented in Fig. 2, namely with the opening between the jaws or pressers presented in the direction in which the jaw-devices are traveling. As a result of this, one end of the doubled-up wrapper is presented in the direction in which the wrapping-head is traveling.

I employ devices by means of which one upstanding side-portion of the wrapper is turned down upon the article and then the other upstanding side-portion is turned over upon the first. In the present instance this work is accomplished by means of folding guides 78 and 79 (Fig. 1), mounted in fixed position above the path of the jaw-devices, and arranged to act successively upon the respective side-portions of the wrapper.

The side-portions of the wrapper having been folded down in the manner just explained, the end-portions of the wrapper are twisted at the opposite ends of the article. This twisting is effected automatically by rotating twisters, the acting members of which close upon the end-portions of the wrapper and effect the twisting thereof.

The twisters are mounted upon the wrapping-head and travel therewith and effect the twisting while traveling. Each twister consists of a pair of jaws which at the proper time close upon the corresponding projecting end-portion of the wrapper which has been folded into tubular shape about the inclosed article, the closing operation serving to gather the sides of the tube together, and the rotation of the twister operating to compress the portion of the wrapper that is grasped by the jaws, and also twist the end-portion of the wrapper, making one or more turns in such end-portion at and adjacent the place that is inclosed by the jaws. For greater simplicity and convenience in the construction of the machine, the two twisters are located in line with each other radially of the rotating portion of the machine, and at opposite sides radially of the holding-jaw devices. The twisters and their actuating mechanism are shown combined with the machine in Figs. 2 and 3 and separately in Figs. 10 and 11, Sheet 6 and Figs. 13, 14, 15, Sheet 5. Each twister comprises a pair of jaws 90, 90, upon the extremities of arms 91, 91, carried by the twister-head 92. The said twister-head is formed with a sleeve which is mounted to turn in bearings 93, 93, forming a part of the arm 4, and for the purpose of rotating the twister-head a spur-pinion 94 is fixed upon the said sleeve between the bearings 93, 93, such pinion being in driving engagement with a spur-gear 95 fixed on a radial shaft 96 (Fig. 3, and Figs. 10, 11, Sheet 6) supported in bearings 97, 97, in connection with the arm 4, the said shaft being driven by means of a bevel-wheel 98 fixed thereon, a bevel-wheel 99 with which wheel 98 engages, an upright shaft 100 on which the bevel-wheel 99 is fixed, the said upright shaft turning in a bearing carried by the arm 4, and a spur-pinion 101 (Fig. 3) fixed on the lower end of the said shaft 100 and engaging with a circular toothed rack 102 on the outer edge of the fixed plate 24. As the wrapping-head travels around, the engagement of the spur-pinion 101 with the said fixed rack 102 causes such spur-pinion and the shaft 100 and bevel-wheel 99 to rotate, and from the said bevel-wheel the radial shaft 96 is rotated through the connections described. The two twisters are driven from the opposite ends of the radial shaft 96 through a duplication of the driving-connections 94, 95.

The arms 91, 91, of a twister are pivotally mounted in connection with the twister-head 92. They occupy normally an open retracted position, such, for instance, as that in which they are shown in Figs. 2, 3, 10, 11, 13. They are adapted to swing from this position into one in which the jaws 90, 90, are closed together as in Figs. 14 and 15, Sheet 5, and are caused to swing back into the open position again. The twisters have a continuous rotary motion, and during such rotary motion are closed at intervals for the purposes of the twisting and then opened again. The means of operating the arms and jaws of the twisters to close and open the latter may vary in practice. Herein, I have shown a simple construction of operating devices comprising pinions 104, 104, on the pivots 103, 103, of the arms 91, 91, an axially disposed rack-bar 105 contained within the sleeve of the twister-head and engaging with both of the said pinions, and means for moving the said rack-bar longitudinally in the proper directions to close and open the twister-jaws. The rack-bars of the two twisters are operatively combined with the same train of mechanism, whereby they are actuated simultaneously. Thus the rack-bar of the outer twister is provided with a grooved collar 106 engaged by a forked arm 107 fixed upon an upright rockshaft 108 at the outer end of arm 4. Rockshaft 108 also has fixed thereupon a second arm 109 which is connected by means of a connecting-rod 110 (Figs. 3 and 11) with a lever-arm 111 connected to turn in unison with a cam-operated lever-arm 112, both being fixed upon an upright rockshaft 113 near the inner end of arm 4, the said rockshaft having fixed thereon a forked arm 114 engaging with a grooved collar 115 on the rack-bar of the inner twister. The upright rockshaft 113 is mounted to turn in bearings in connection with the arm 4, the arm 112 at its lower end being provided with a roll or pin 112$^a$ (Fig. 11) working in a cam-groove, 112$^b$, (Fig. 2) in the fixed table 24. The said cam-groove is so shaped that it actuates the described devices, and through the forked arms and the grooved collars engaged thereby, moves the rack-bars lengthwise at the proper times, and in the proper directions to close and open the twisters as required. To render the action of the jaws 90, 90, yielding in closing upon the wrapper so that they may accommodate themselves to the bulk of the portions which they embrace, and clasp the same tightly yet without crushing or cutting the wrapper, provisions for securing the yielding action are interposed at proper points. In the present instance the grooved collars 106, 115, are movable lengthwise upon the rack-bars, and expanding spiral springs 123, 123, are confined between such collars and fixed collars 124, 124, upon the rack-bars. The springs in expanding tend to hold the collars 123, 123, against other fixed collars 125, 125, on the rack-bars. The force which is transmitted through the forked arms to the grooved collars tending to move the rack-bars in the direction to close the jaws of the twisters upon the wrapper, acts through the springs and hence is transmitted in a yielding manner to the rack-bars and through them and the spur-pinions to the arms and jaws of the twisters.

The twisters preferably are mounted with capacity for adjustment toward and from each other, so that the intervening distance may be varied to suit different lengths of articles. This adjustability may be provided for in various ways. In the illustrated instance the sleeves 92, 92, are capable of being shifted lengthwise toward or from each other through the eyes or central openings of the actuating spur-gears 94, 94. To cause them to turn in unison with the said spur-gears, the sleeves are furnished with longitudinal splines 92$^a$, 92$^a$, (Fig. 10) engaging with the spur-gears. The adjustment of the twisters toward and from each other is effected in this instance by means of adjusting devices in engagement with both sleeves, and acting to move the twisters simultaneously either toward each other or away from each other. For the purposes of the said adjustment, each sleeve 92 is furnished with a grooved collar 92$^c$, and forked levers 126, 126, engage with such collars. These levers are mounted by vertical pivots at 127, 127, (Figs. 11 and 12), upon fixed portions of arm 4, so that they are capable of a swinging movement toward and from each other. Each has connected therewith pivotally a nut 128 working upon a screw-threaded portion of an adjusting shaft 129. The opposite threads of the said shaft are, respectively, right and left handed. A grooved collar 130 upon said shaft engages with a fork 131 in connection with arm 4, such fork serving to prevent movement of the shaft endwise. The shaft is furnished with a handle 132 for convenience in turning the same. When the shaft is turned, the nuts 128, 128, are screwed toward or away from each other, as the case may be, and thereby the levers 126, 126, are swung so as to shift the twisters toward and from each other, as required. The vertical rockshafts 108 and 113 are mounted in bearings provided in connection with the levers 126, 126, so that such rockshafts accompany the said levers in the movement of adjustment of the latter, and in consequence of the engagement of roll 112$^a$ with the walls of the cam-groove in which it works the rack-bars are automatically shifted so that the extent to which the jaws of the twisters are opened is not varied materially by reason of the adjustment.

In the broader phases of the invention the latter is not restricted with respect to the particular mode of mounting the twister-jaws upon the twister, or to the specific construction of the twister and its jaws. Certain particular features of the invention, however, comprise a novel mode of mounting, and a novel construction, by means of which novel and improved results are attained. The said novel mode of mounting consists in locating the pivots of the jaws of a twister at opposite sides of the axis of rotation of the twister, extending the arms of the jaws in opposite directions across such axis, and disposing each jaw at the side of such axis opposite that at which its pivot is located. This is clearly shown in the drawings. This enables me to employ comparatively long jaw-arms, although the jaws describe a small circle in rotating when open. It also results in causing the jaws to continue to approach more closely to the ends of the article as they close together. It further permits the employment of long arms, so that ample space for the accommodation of the expanded end of a wrapper may be provided between the closed-together jaws and the twister-head.

As will be perceived from Figs. 13 and 14, Sheet 5, the twister jaws have V-shaped notches, and as the jaws close together the oppositely projecting horns of the jaws gather in the portion of wrapper projecting beyond the article inclosed therein, puckering it together closely in a bunch gathered-in equally from all sides. The portion thus gathered in is twisted close to the end of the article by the rotation of the twister, this action taking place simultaneously at opposite ends of the article. In the case of each jaw of a twister, one of the horns thereof is offset or set askew with relation to the other horn thereof, and when the two jaws of the twister come together they cross obliquely, their horns interlapping as shown in Fig. 14, Sheet 5. This oblique crossing of the two jaws of a twister produces a screwing action upon the wrapper as the twister rotates, which works the end-portion of the wrapper away from the corresponding end of the inclosed article. The conditions are reversed in the case of the two twisters, so that the opposite end-portions of a wrapper are drawn lengthwise in opposite directions away from the inclosed article, thereby causing the wrapper to fit snugly about the said article, eliminating slackness or looseness of the wrapper.

Various modifications may be made in the construction of a machine without involving a departure from the invention, the principles of which admit of being variously embodied in practice.

I claim as my invention:

1. In a wrapping machine, the combination with wrapper-supply and article-supply stations, and a traveling carrier having a receiver which passes said stations and receives therefrom a wrapper and an article to be inwrapped therein, of means for bending said wrapper about said article, wrapper-end twisting devices traveling with said carrier and means producing relative rotation between the associated article and wrapper and the said wrapper-end twisting devices to thereby secure the wrapper in closed condition about the article.

2. In a wrapping machine, the combination with wrapper-supply and article-supply stations, and a traveling carrier having a receiver which passes said stations and receives therefrom a wrapper and an article, of means for bending said wrapper about said article, and means by which the opposite projecting wrapper-ends are twisted while the inwrapped article is being carried along by the movement of the carrier.

3. In a wrapping machine, the combination with wrapper-supply and article-supply stations, and a traveling carrier having a receiver which passes said stations and receives therefrom a wrapper and an article, of means for infolding said wrapper about said article, and twisters traveling with the carrier and by which the opposite projecting wrapper-ends are twisted while the inwrapped article is being carried along by the movement of the carrier.

4. In a wrapping machine, the combination with wrapper-supply and article-supply stations, and a traveling carrier having a receiver which passes said stations and receives therefrom a wrapper and an article to be inwrapped therein, of devices for bending the wrapper into U-shape about the article and causing one side-portion thereof to overlie the other, and means by which the projecting wrapper-ends are twisted while the inwrapped article is being carried along by the movement of the carrier.

5. In a wrapping machine, the combination with wrapper supply and article-supply stations, and a traveling carrier having a receiver which receives from said stations a wrapper and an article to be inwrapped therein, of devices for bending the wrapper into U-shape about the article and causing one side-portion thereof to overlie the other, and twisters traveling with the carrier and by which the projecting wrapper-ends are twisted while the inwrapped article is being carried along by the movement of the carrier.

6. In a wrapping machine, the combination of wrapper-supply mechanism comprising a pair of feed-rolls 6, 6, means for rotating the said feed rolls to advance the wrapper-material to the inwrapping mechanism, upper and lower strip-guides 7, 7, shears 8, 8ª, and shear-actuating means to cause a wrapper length to be severed for delivery to the inwrapping mechanism, with inwrapping mechanism constructed and timed to receive the said wrapper length from the said strip-guides and to inwrap the desired article therewith.

7. In a wrapping machine, the combination with inwrapping mechanism, of wrapper-supply mechanism comprising feed-rolls for the wrapper-material to advance the latter to the inwrapping mechanism, shears for cutting off a wrapper-length for delivery to the inwrapping mechanism, and means to adjust the feed-rolls and shears forward and back in the line of feed to locate a wrapper in the desired position relative to the inwrapping mechanism.

8. In a wrapping machine, the combination with inwrapping mechanism, of wrapper-supply mechanism comprising feed-rolls, shears, a stand carrying said feed-rolls and shears, and means to adjust said stand forward and back in the line of feed to conform to variation in length of wrapper to be delivered to the inwrapping mechanism.

9. In a wrapping machine, the combination with inwrapping mechanism, of wrapper-supply mechanism comprising feed-rolls, means for rotating said feed-rolls to advance the wrapper-material to the inwrapping mechanism, shears, and means for adjusting rate of feed and bodily adjusting feed-rolls and shears conjointly and simultaneously by one adjusting device to vary the wrapper-length and locate a predetermined portion of the wrapper in the predetermined relation to the inwrapping mechanism, thereby compensating for variation in wrapper-length.

10. In a wrapping machine, the combination with inwrapping mechanism, of wrapper-supply mechanisms comprising feed-rolls, an adjustable stand therefor, and feed-roll driving means comprising a driven brush-wheel in connection with feed-rolls, and a driver brush-wheel, the adjustment of said stand forward or back effecting a relative shift of the brush-wheels whereby the speed of the feed-rolls is varied and thereby varying the wrapper-length as well as compensating for such variation so as to cause a predetermined portion of each wrapper to be located in the predetermined position relative to the inwrapping mechanism.

11. In a wrapping machine, the combination of wrapper-supply mechanism comprising feed-rolls, a brush-wheel in connection with said feed-rolls, shears for cutting wrapper-lengths from the material fed by said feed-rolls, a stand carrying the said parts, adjustable forward and back in the line of feed, a rotating shaft, a driving brush-wheel carried by said shaft and making contact by its periphery with a side of the brush-wheel first mentioned, and a shear-actuating cam carried by said shaft with inwrapping mechanism constructed and timed to receive a wrapper cut off by the said shears and to inwrap the desired article therewith.

12. In a wrapping machine, in combination, a traveling wrapping head, means for supplying a wrapper thereto, an article-supply station having a support for an article to be wrapped, means for supplying an article to said support, and a sweep traveling with said wrapping head and operating to transfer the article from the support to the wrapper previously supplied to the head.

13. In a wrapping machine, in combination, an article-supply station having a trough, means for supplying an article to said trough, and a traveling wrapping head having means for taking such article from the trough in passing the latter and assembling it with the wrapper for the inwrapment.

14. In a wrapping machine, in combination, a traveling wrapping head, means for supplying a wrapper thereto, an article-supply station having a moving article-conveyer and an article-support to which said conveyer delivers, and means traveling with said wrapping head and operating to transfer the article from the support to the wrapper previously supplied to the head.

15. In a wrapping machine, in combination, a wrapper-supply station, an article-supply station and a traveling wrapping-head having a receiver, which receives a wrapper from said wrapper-supply station and an article from said article-support, and means for bending the wrapper around the article, and twisting devices traveling with the wrapping head and acting upon the wrapper at opposite sides of the article.

16. In a wrapping machine, the combination with a receiver, means for supplying a wrapper thereto, means for supplying an article and pressing the latter and the wrapper into the receiver, thereby causing marginal portions of the wrapper to extend alongside the article, means for folding such portions of the wrapper toward each other, means for giving a quarter turn to the receiver, and means acting upon the outstanding portions of the wrapper to complete the inwrapment.

17. In a wrapping machine, the combination with wrapper-supply and article-supply stations, of a traveling carrier having a rotatable receiver which passes said stations and receives therefrom a wrapper and an article to be wrapped therein, means for pressing said article and wrapper in to the receiver and thereby causing marginal portions of the wrapper to turn up, means for folding the upturned portions of the wrapper toward each other, means for giving a quarter turn to the receiver, and means acting upon the remaining portions of the wrapper to complete the inwrapment.

18. In a wrapping machine, in combination, a traveling wrapping-head having a spring-backed movable rest which receives a wrapper and an article thereon, and side-jaws or pressers, means for moving the article, wrapper, and rest between said side-jaws or pressers and thereby bending the wrapper about the article, stationary folders which act longitudinally of the side-portions of the wrapper as the wrapping-head advances and thereby fold over such portions.

19. In a wrapping machine, in combination, a traveling wrapping-head having a spring-backed movable rest which receives a wrapper and an article thereon, and side-jaws or pressers, means for moving the article, wrapper, and rest between said side-jaws or pressers and thereby bending the wrapper about the article, stationary folders which act longitudinally of the side-portions of the wrapper as the wrapping-head advances and thereby fold over such portions, and means for twisting the ends of the wrapper.

20. In a wrapping machine, in combination, a traveling wrapping-head having a receiver comprising a movable rest which receives a wrapper and an article thereon and side-jaws or pressers, and also having wrapper-end twisting means at opposite sides of said receiver, means for moving the article, wrapper, and rest between said side-jaws or pressers and thereby bending the wrapper about the article, stationary folders which act to fold over the side-portions of the wrapper as the wrapping-head advances, and means for giving a quarter-turn to the receiver, to thereby present the wrapper-ends to the twisting means.

21. In a wrapping machine, in combination, a wrapper-supply station, a traveling wrapping-head, and wrapper-seizing means traveling with said head and comprising a vertically-swinging upper finger which in its upraised position passes over the wrapper-supply devices, and a laterally-swinging lower finger having a retracted normal position.

22. In a wrapping machine, in combination, a wrapper-supply station, a traveling wrapping-head provided with a rotary receiver, and with wrapper-seizing means traveling with said head and comprising a vertically-swinging upper finger which in its upraised position passes over the wrapper-supply devices, and a laterally-swinging lower finger having a laterally-retracted normal position clear of the said receiver.

23. In a wrapping-machine, the combination with a wrapper-supply station, article-supply station having a support for the article to be wrapped, and traveling wrapping-head, of a finger moving with said wrapping-head, and means for lifting it above the wrapper-supply devices and lowering it to act at the article-supply station to take the article from the said support.

24. In a wrapping machine, the combination with a wrapper-supply station, of a traveling wrapping-head, a receiver moving with said wrapping-head having a movable rest and side-jaws or pressers, a presser-device also traveling past said wrapper-supply station and actuating means therefor whereby it is lifted above the wrapper-supply devices in passing the latter and then caused to act upon the article to depress the latter, the wrapper and the rest between the said side-jaws or pressers.

25. In a wrapping machine, in combination, wrapper-supply devices, article-supply devices, a traveling wrapping-head provided with a receiver consisting of a rest and side-jaws or pressers, wrapper-seizing fingers, an article-sweeping finger, and a presser-finger, means for actuating said fingers and causing the upper ones to pass over the wrapper-supply devices, means to give the receiver a quarter-turn, and stationary folders for the upturned side-portions of the wrapper.

26. In a wrapping machine, in combination, wrapper-supply devices, article-supply devices, a traveling wrapping-head provided with a receiver consisting of a rest and side-jaws or pressers, wrapper-seizing fingers, an article-sweeping finger, and a presser-finger, means for actuating said fingers and causing the upper ones to pass over the wrapper-supply devices, means to give the receiver a quarter-turn, stationary folders for the upturned side-portions of the wrapper, and means for closing-in the projecting end-portions of the wrapper after the side-portions have been folded over.

27. In a wrapping machine, in combination, wrapper-supply devices, article-supply devices, a traveling wrapping-head provided with a receiver consisting of a rest and side-jaws or pressers, wrapper-seizing fingers, an article-sweeping finger, and a presser-finger, means for actuating said fingers and causing the upper ones to pass over the wrapper-supply devices, means to give the receiver a quarter-turn, stationary folders for the upturned side-portions of the wrapper, and twisters carried by the wrapping-head for twisting the projecting end-portions of the wrapper.

28. In a wrapping machine, a rotative twister having jaws hung upon pivots located at different sides of the axis on which the twister rotates, with the acting portions of the respective jaws arranged to work at the opposite sides of said axis from the respective pivots.

29. In a wrapping machine, a rotating twister having jaws hung upon pivots located at different sides of the axis of rotation of the twister, with the acting portions of said jaws working at opposite sides of said axis from the pivots, pinions in connection with said jaws, and a longitudinally movable rack-bar engaging with said pinions, adapted by longitudinal movement to close the jaws together and open them.

30. In a wrapping machine, a rotary twister having jaws provided with oblique engaging portions which close together upon a wrapper and twist it together as the twister rotates, said oblique engaging portions adapted in the rotation of the twister to extend the wrapper lengthwise.

31. In a wrapping machine, in combination, a pair of rotary twisters located opposite each other, each of said twisters having jaws which close together upon a wrapper and twist its end-portions as the twisters rotate, the jaws of each twister having oblique engaging portions adapted in the rotation of the twister to extend the wrapper lengthwise, and those of one twister arranged to act oppositely with relation to those of the other.

32. In a wrapping machine, in combination, a pair of rotary twisters located opposite each other, each twister comprising a rotatable sleeve, jaws pivoted to such sleeve, jaw-actuating bars within the said sleeves, means to actuate the said bars to open and close the said jaws without movement of the sleeves toward or from each other, and means to adjust toward and from each other the positions in which the sleeves and jaws rotate.

33. In a wrapping machine, in combination, a pair of jaws provided with pinions, a rotary sleeve to which the said jaws are pivoted, a rack-bar engaging said pinions, and actuating means for said rack-bar, including a spring to allow jaws to yield to avoid crushing.

34. In a wrapping machine, a plurality of horizontally traveling carriers, mechanism operating to deliver articles singly to the carriers, each article being partially wrapped during such delivery, means to rotate the carrier while traveling, and means to complete the wrapping operation by the mentioned rotation.

35. In a wrapping machine, an endless conveyer, a plurality of carriers mounted on the conveyer, mechanism to deliver articles singly to the carriers, each article being partially wrapped during its delivery, and strips arranged to traverse the conveyer and to engage the partially wrapped articles, the strips operating automatically during continued movement of the carriers to complete the wrapping operation.

36. In a wrapping machine, an endless conveyer operating in a substantially horizontal plane, a plurality of carriers mounted on the conveyer, each carrier being individually rotatable with its axis of rotation extending vertically, mechanism to deliver articles singly to the carriers, each article being partially wrapped during its delivery, means arranged in the path of movement of the partially wrapped article to rotate the carriers, and means including a pair of wrapper-engaging strips arranged to extend at an angle across the conveyer to complete the wrapping operation during continued movement of the carriers.

37. A wrapping machine including an endless conveyer, a plurality of carriers movable therewith, means for automatically supplying wrapping material over said carriers, means for automatically feeding the articles, one at a time, on to the said material and within the said carriers, the article-feeding operation being controlled by movement of said conveyer, means for varying the position of the carriers at predetermined intervals with respect to the said conveyer and means disposed in the path of movement of said carriers for folding said material upon the article, as and for the purpose set forth.

38. In a wrapping machine, an endless conveyer, a plurality of carriers movable with the conveyer, each carrier being individually rotatable with its axis of rotation extending vertically, means to deliver an article to each carrier and to partially wrap such article during delivery, guide means directing movement of the carriers, means disposed in the path of movement of said carriers to effect rotation, and means to complete the wrapping operation.

39. In a wrapping machine, a plurality of individually rotatable carriers, means operating to deliver articles singly to the carriers, each article being partially wrapped during its delivery, strips extending at an angle across the top of the carriers to assist in the wrapping operation, means to rotate the carriers, and means operating to complete the wrapping of the article subsequent to the rotation of the carriers, as and for the purpose set forth.

40. In a wrapping machine, a movable support, means to move the support, means to deliver an article onto the support, means to partially wrap the article incident to its delivery, means to rotate the support while moving, means to continue the wrapping operation while moving, and means to complete the wrapping operation subsequent to rotation.

41. A wrapping machine including an endless conveyer, a plurality of rotatable carriers movable with said conveyer, means for supplying wrapping material over the carriers, means for feeding articles, one at a time, on to the wrapping material and into the carriers, said articles being partially wrapped by reason of the engagement of the said material with the said carriers, means disposed in the path of movement of said carriers for rotating the same at predetermined intervals after receiving the articles, and means disposed in the path of movement of said carriers to continue the folding of the wrapper upon the article, as and for the purpose set forth.

42. In a wrapping machine, in combination, a moving carrier having a series of receivers, article-supply means, means for automatically feeding wrapping material to the said receivers, means operated by the said carrier to feed the articles, one at a time, from the said article-supply means on to the said wrapping material and into the receivers, and means including a pair of angular strips adapted to fold the wrapping material over the article held by a receiver.

43. In a wrapping machine, in combination, a moving carrier, a series of receivers mounted thereon, article-supply means above the said carrier, means for feeding wrapping material into a position between a receiver and said article-supply means, means operated by the said carrier to feed the articles successively on to the wrapping material and into the receivers, angularly-disposed strips arranged adjacent the said carrier adapted to fold opposite portions of the said material over an article within a receiver, and means for twisting the opposite ends of a folded-over wrapper.

44. In a wrapping machine, in combination, a moving carrier, a series of receivers mounted thereupon, means for feeding articles, one at a time, on to wrapping material supplied to said receivers, means for folding the wrapping material partly around an article during the forcing of the latter into a receiver, oppositely-inclined guides adapted to complete such folding, and twisting means for twisting the ends of a wrapper.

45. In a wrapping machine, mechanism operating to wrap articles, the wrapping material covering the top, bottom and sides thereof, means moving the article during a wrapping operation, and oppositely-inclined strips adapted for engagement with the wrapping material extending above the article during the traveling movement thereof to fold said extended portions of the wrapper over the top of the article, as and for the purpose set forth.

In testimony whereof I affix my signature in presence of two witnesses.

EUSTACE P. KNOTT.

Witnesses:
CHAS. F. RANDALL,
NATHAN B. DAY.